(12) United States Patent
Luo

(10) Patent No.: US 10,619,864 B2
(45) Date of Patent: Apr. 14, 2020

(54) HEAT PUMP WATER HEATER AND CONTROL METHOD THEREOF

(71) Applicants: GD Midea Heating & Ventilating Equipment Co., Ltd., Foshan, Guangdong (CN); Midea Group Co., Ltd., Foshan, Guangdong (CN)

(72) Inventor: Mingwen Luo, Guangdong (CN)

( * ) Notice: Subject to any disclaimer, the term of this patent is extended or adjusted under 35 U.S.C. 154(b) by 564 days.

(21) Appl. No.: 14/963,794

(22) Filed: Dec. 9, 2015

(65) Prior Publication Data

US 2016/0265794 A1 Sep. 15, 2016

(30) Foreign Application Priority Data

Mar. 11, 2015 (CN) .......................... 2015 1 0106969

(51) Int. Cl.
*F24D 19/10* (2006.01)
*F24H 4/04* (2006.01)
*F24D 12/02* (2006.01)

(52) U.S. Cl.
CPC ......... *F24D 19/1072* (2013.01); *F24D 12/02* (2013.01); *F24D 19/1081* (2013.01); *F24H 4/04* (2013.01); *Y02B 30/14* (2013.01)

(58) Field of Classification Search
CPC .. F24D 12/02; F24D 19/1072; F24D 19/1081; F24H 4/04; Y02B 30/14
USPC ............... 392/441, 447, 449, 450, 451, 454; 219/482–518
See application file for complete search history.

(56) References Cited

U.S. PATENT DOCUMENTS

| 5,906,109 A * | 5/1999 | Dieckmann ............... F24H 4/04 237/2 B |
| 8,422,870 B2 * | 4/2013 | Nelson ...................... F24H 4/04 392/461 |
| 2003/0178498 A1* | 9/2003 | Saitoh ..................... F24D 17/02 237/2 B |
| 2005/0111991 A1* | 5/2005 | Chida ...................... F24D 17/02 417/207 |
| 2005/0189431 A1* | 9/2005 | Nakayama ................ F24H 4/04 237/12 |

(Continued)

FOREIGN PATENT DOCUMENTS

| CN | 203375710 U | 1/2014 |
| CN | 103900248 A | 7/2014 |

(Continued)

*Primary Examiner* — Ibrahime A Abraham
*Assistant Examiner* — Frederick F Calvetti
(74) *Attorney, Agent, or Firm* — Kilpatrick Townsend & Stockton, LLP

(57) ABSTRACT

The present invention provides a heat pump water heater and a control method thereof. The control method is used for controlling the heat pump water heater and includes: detecting a temperature of water in a water tank; if the water temperature is not larger than a first preset temperature value, controlling, by a controller, a heating device to heat at a first average heating power; if the water temperature is larger than the a second preset temperature value, controlling the heating device to stop heating; otherwise, if detecting that water flows into the water tank, controlling the heating device to heat at a second average heating power, and if detecting that no water flows into the water tank, controlling the heating device to heat at a third average heating power.

5 Claims, 2 Drawing Sheets

(56) References Cited

U.S. PATENT DOCUMENTS

| | | | | |
|---|---|---|---|---|
| 2007/0205298 A1* | 9/2007 | Harrison | ............. | F24D 11/0221 |
| | | | | 237/2 B |
| 2009/0223509 A1* | 9/2009 | Hoellenriegel | ..... | F24D 11/0221 |
| | | | | 126/643 |
| 2010/0209084 A1* | 8/2010 | Nelson | ...................... | F24H 4/04 |
| | | | | 392/465 |
| 2010/0281899 A1* | 11/2010 | Garrabrant | .............. | F24D 12/02 |
| | | | | 62/238.1 |
| 2011/0058795 A1* | 3/2011 | Kleman | ................ | F24H 9/2021 |
| | | | | 392/308 |
| 2011/0315093 A1* | 12/2011 | Minamisako | ....... | F24D 11/0214 |
| | | | | 122/1 R |
| 2012/0145095 A1* | 6/2012 | Nelson | ...................... | F24H 4/04 |
| | | | | 122/15.1 |
| 2014/0291411 A1* | 10/2014 | Tamaki | ..................... | F24D 3/18 |
| | | | | 237/2 B |
| 2015/0338129 A1* | 11/2015 | Matsuzawa | ............... | F24H 4/04 |
| | | | | 122/14.3 |

FOREIGN PATENT DOCUMENTS

| | | | |
|---|---|---|---|
| CN | 103900253 A | | 7/2014 |
| CN | 204187834 U | | 3/2015 |
| JP | 2009299988 A | | 12/2009 |
| JP | 2014222120 A | | 11/2014 |
| WO | WO2014188575 | * | 11/2014 |

* cited by examiner

HEAT PUMP WATER HEATER AND CONTROL METHOD THEREOF

FIELD OF THE INVENTION

The present invention relates to the field of refrigeration equipment, and particularly relates to a control method for controlling a heat pump water heater and a heat pump water heater.

BACKGROUND OF THE INVENTION

In an existing heat pump water heater, because the heating capacity of a heat pump system is relatively small, and the heating capacity decays at a low ambient temperature, an auxiliary electric heater is generally added for heating. Generally speaking, the heating rate of the electric heater is faster, while the heating rate of the heat pump system is slower; meanwhile, the heating efficiency of the electric heater is lower, while the heating efficiency of the electric heater is higher. In this case, it is particularly important to select which heat source at what time for heating to meet the hot water demand and energy saving demand of a user.

The existing thermal storage type water heater is generally started according to the temperature difference between a water temperature in a water tank and a set water temperature as a starting condition, in general, when the water temperature in the water tank is close to the set water temperature, the heat pump system is selected for heating to improve the heating energy efficiency; when the temperature difference between the water temperature in the water tank and the set water temperature is relatively large, the electric heater is selected for heating to shorten the heating time. The reduction of the water temperature in the water tank may be caused by water consumption of the user and may also be caused by natural heat dissipation of water in the water tank, therefore if the condition is used as the startup condition of the heat pump water heater, the water consumption condition of the user cannot be well reflected, and thus the heating source cannot be reasonably selected according to the water consumption condition of the user.

SUMMARY OF THE INVENTION

The present invention aims at solving at least one of the technical problems in the prior art.

For this reason, an object in one aspect of the present invention is to provide a control method for a heat pump water heater, in which different heating powers can be selected according to water consumption of a user or natural heat dissipation of a water tank, in order to improve the heating energy efficiency and improve the heating efficiency at the same time.

An object in another aspect of the present invention is to provide a heat pump water heater.

To achieve the above objects, embodiments in one aspect of the present invention provide a control method for controlling a heat pump water heater. The control method includes the following steps: detecting a temperature value of water in a water tank of the heat pump water heater; if the temperature value of water in the water tank is not larger than a first preset temperature value, controlling, by a controller of the heat pump water heater, a heating device of the heat pump water heater to heat at a first average heating power; if the temperature of water in the water tank is larger than the a second preset temperature value, controlling the heating device to stop heating; otherwise, if detecting that water flows into the water tank, controlling the heating device to heat at a second average heating power, and if detecting that no water flows into the water tank, controlling the heating device to heat at a third average heating power; wherein the second preset temperature value is larger than the first preset temperature value, and the first average heating power is larger than the third average heating power.

In the above embodiments of the present invention, if the water temperature in the water tank is not larger than the first preset temperature value, it indicates that the water temperature in the water tank is too low at the moment, and the heating device quickly heats the water tank at the first average heating power to shorten the heating time and guarantee hot water available in the water tank for use by the user; if the water temperature in the water tank is larger than the second preset temperature value, it indicates that the water temperature in the water tank is relatively high at the moment, needing no heating, and hot water in the water tank can be directly used; if the water temperature in the water tank is between the first preset temperature value and the second preset temperature value, and water flows into the water tank, it indicates that the reduction of the water temperature in the water tank is mainly caused by water consumption of the user, at this time, the heating device heats at the second average heating power to heat the water flowing into the water tank for use by the user; if the water temperature in the water tank is between the first preset temperature value and the second preset temperature value, and no water flows into the water tank, it indicates that the reduction of the water temperature in the water tank is mainly caused by natural heat dissipation, at this time, the heating device heats at the third average heating power to compensate for the reduction of the water temperature caused by the natural heat dissipation.

To sup up, in the control method provided by the above embodiments of the present invention, when the water temperature in the water tank is judged as low and heating is necessary, whether water flows into the water tank is further judged, namely, determining whether the reduction of the water temperature is caused by water consumption or natural heat dissipation at the moment, so as to heat at different average heating powers according to different conditions, in this way, the heating time can be shorten to guarantee enough hot water for use by the user, and meanwhile the heating energy efficiency can be improved.

In addition, the control method provided by the above embodiments of the present invention further has the following additional technical features:

according to an embodiment of the present invention, if the temperature value of water in the water tank is larger than the first preset temperature value and is not larger than the second preset temperature value, and the flow rate of water flowing into the water tank is detected to be larger than a preset flow rate, controlling, by the controller, the heating device to heat at a fourth average heating power, and if the flow rate of water flowing into the water tank is detected to be not larger than the preset flow rate, controlling the heating device to heat at a fifth average heating power; when the temperature value of water in the water tank rises to a third preset temperature value, controlling the heating device to stop heating; wherein the fourth average heating power is larger than the fifth average heating power, and the third preset temperature value is larger than or equal to the second preset temperature value.

According to an embodiment of the present invention, whether water flows into the water tank is detected by detecting the reduction speed of the water temperature in the water tank: if the reduction speed of the water temperature in the water tank is larger than a preset water temperature reduction speed, controlling the heating device to heat at the fourth average heating power, and if the reduction speed of the water temperature in the water tank is not larger than the preset water temperature reduction speed, controlling the heating device to heat at the fifth average heating power.

According to an embodiment of the present invention, when the temperature of water in the water tank is not larger than the first preset temperature value, controlling the heating device to heat at a sixth average heating power at first, and when the temperature value of water in the water tank rises to a fourth preset temperature value, heat at a seventh average heating power until the temperature value of water in the water tank rises to a fifth preset temperature value, and then controlling the heating device to stop heating; wherein the sixth average heating power is larger than the seventh average heating power, and the fifth preset temperature value is larger than the fourth preset temperature value.

According to an embodiment of the present invention, the fifth preset temperature value is equal to the third preset temperature value; the third average heating power, the fifth average heating power and the seventh average heating power are equal.

According to an embodiment of the present invention, the heating device includes a first sub-heating device, a second sub-heating device and a third sub-heating device, the first sub-heating device being a heat pump system, and both of the second sub-heating device and the third sub-heating device being electric heaters; if the temperature value of water in the water tank is not larger than the first preset temperature value, controlling, by the controller, the second sub-heating device to heat at first, when the temperature value of water in the water tank rises to the fourth preset temperature value, controlling the first sub-heating device to heat, and when the temperature value of water in the water tank rises to the fifth preset temperature value, controlling the first sub-heating device to stop heating; if the temperature value of water in the water tank is larger than the first preset temperature value and is not larger than the second preset temperature value, and the flow rate of water flowing into the water tank is larger than the preset flow rate, controlling the third sub-heating device to heat, and when the water temperature in the water tank rises to the fifth preset temperature value, controlling the third sub-heating device to stop heating; when detecting that the flow rate of water flowing into the water tank is not larger than the preset flow rate or no water flows into the water tank, controlling the first sub-heating device to heat, and when the water temperature in the water tank rises to the fifth preset temperature value, controlling the first sub-heating device to stop heating.

Embodiments in another aspect of the present invention provide a heat pump water heater, including a water tank, wherein a temperature detecting device and a first detecting device for detecting whether water flows into the water tank are arranged on the water tank; a heating device capable of heating water in the water tank at different powers; and a controller, wherein the heating device, the temperature detecting device and the first detecting device are all electrically connected with the controller, and the controller is capable of controlling the heating device to heat at different powers.

In addition, the heat pump water heater provided by the above embodiments of the present invention further has the following additional technical features:

according to an embodiment of the present invention, the first detecting device includes: a flowmeter arranged at a water inlet or a water outlet of the water tank; a comparing unit, wherein the comparing unit is electrically connected with the flowmeter, stores a preset flow rate therein, and is capable of comparing the preset flow rate with the flow rate of water detected by the flowmeter; and a judging unit, wherein the judging unit is electrically connected with the comparing unit and capable of judging whether water flows into the water tank according to a comparative result of the comparing unit, and the judging unit is electrically connected with the controller.

According to an embodiment of the present invention, the first detecting device includes: a comparing unit, wherein the comparing unit is electrically connected with the temperature detecting device, stores a preset water temperature reduction speed therein, and is capable of comparing the preset water temperature reduction speed with a water temperature reduction speed detected by the water temperature detecting device; and a judging unit, wherein the judging unit is electrically connected with the comparing unit and capable of judging whether water flows into the water tank according to a comparative result of the comparing unit, and the judging unit is electrically connected with the controller.

According to an embodiment of the present invention, the heating device includes a plurality of sub-heating devices, and the plurality of sub-heating devices are all electrically connected with the controller.

According to an embodiment of the present invention, the heating device includes a first sub-heating device, a second sub-heating device and a third sub-heating device, and the first sub-heating device, the second sub-heating device and the third sub-heating device are all electrically connected with the controller.

According to an embodiment of the present invention, the first sub-heating device includes a heat pump system composed of a compressor, a condenser, a throttling component and an evaporator, which are connected in sequence, a condenser pipe of the condenser being coiled on the water tank, and the compressor being electrically connected with the controller; both of the second sub-heating device and the third sub-heating device are electric heaters, the second sub-heating device being installed at one end close to the water inlet of the water tank, and the third sub-heating device being installed at one end close to the water outlet of the water tank.

The additional aspects and the advantages of the present invention will become apparent in the following descriptions or are learned in the practice of the present invention.

BRIEF DESCRIPTION OF THE DRAWINGS

The above and/or additional aspects and the advantages of the present invention will become apparent and understandable from the following descriptions on the embodiments in combination with the accompanying drawings, wherein.

Figure 2:
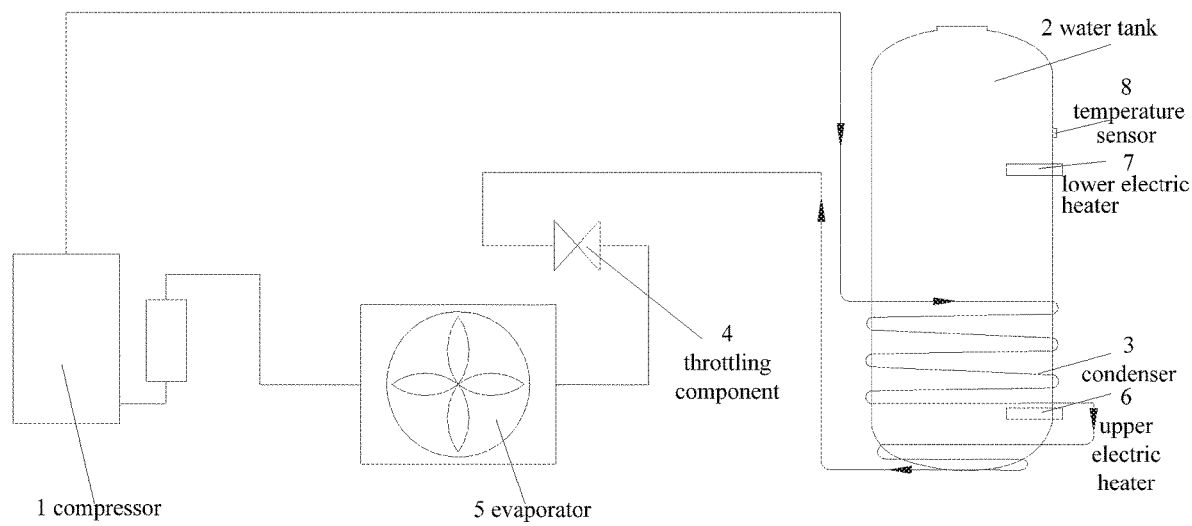
FIG. 2 is a schematic structural diagram of a heat pump water heater according to an embodiment of the present invention.

The corresponding relation between reference signs and component names in FIG. 2 are as follows:

1 compressor, 2 water tank, 3 condenser, 4 throttling component, 5 evaporator, 6 upper electric heater, 7 lower electric heater, and 8 temperature sensor.

DETAILED DESCRIPTION OF THE EMBODIMENTS

In order that the above objects, features and advantages of the present invention can be understood more clearly, a further detailed description of the present invention will be given below in combination with accompanying drawings and specific embodiments. It should be noted that, in the case of no conflict, the embodiments and the features in the embodiments of the present application can be mutually combined.

Numerous specific details are set forth in the following descriptions to fully understand the present invention, however, the present invention can also be implemented in other ways different from those described herein, and thus the protection scope of the present invention is not limited to specific embodiments disclosed below.

A heat pump water heater and a control method thereof according to some embodiments of the present invention will be described below with reference to the accompanying drawings.

A control method provided according to some embodiments of the present invention, used for controlling a heat pump water heater, includes the following steps:

detecting a temperature value of water in a water tank of the heat pump water heater; if the temperature value of water in the water tank is not larger than a first preset temperature value, controlling, by a controller of the heat pump water heater, a heating device of the heat pump water heater to heat at a first average heating power; if the temperature of water in the water tank is larger than the a second preset temperature value, controlling the heating device to stop heating; otherwise, if detecting that water flows into the water tank, controlling the heating device to heat at a second average heating power, and if detecting that no water flows into the water tank, controlling the heating device to heat at a third average heating power; wherein the second preset temperature value is larger than the first preset temperature value, and the first average heating power is larger than the third average heating power.

In the above embodiments of the present invention, if the water temperature in the water tank is not larger than the first preset temperature value, it indicates that the water temperature in the water tank is too low at the moment, and the heating device quickly heats the water tank at the first average heating power to shorten the heating time and guarantee hot water available in the water tank for use by the user; if the water temperature in the water tank is larger than the second preset temperature value, it indicates that the water temperature in the water tank is relatively high at the moment, needing no heating, and hot water in the water tank can be directly used; if the water temperature in the water tank is between the first preset temperature value and the second preset temperature value, and water flows into the water tank, it indicates that the reduction of the water temperature in the water tank is mainly caused by water consumption of the user, at this time, the heating device heats at the second average heating power to heat the water flowing into the water tank for use by the user; if the water temperature in the water tank is between the first preset temperature value and the second preset temperature value, and no water flows into the water tank, it indicates that the reduction of the water temperature in the water tank is mainly caused by natural heat dissipation, at this time, the heating device heats at the third average heating power to compensate for the reduction of the water temperature caused by the natural heat dissipation.

To sum up, in the control method provided by the above embodiments of the present invention, when it is judged that the water temperature in the water tank is low and heating is necessary, whether water flows into the water tank is further judged, namely, determining whether the reduction of the water temperature is caused by water consumption or natural heat dissipation at the moment, so as to heat at different average heating powers according to different conditions, in this way, the heating time can be shortened to guarantee enough hot water for use by the user, and meanwhile the heating energy efficiency can be improved.

In some preferred embodiments of the present invention, if the temperature value of water in the water tank is larger than the first preset temperature value and is not larger than the second preset temperature value, and the flow rate of water flowing into the water tank is detected to be larger than a preset flow rate, controlling, by the controller, the heating device to heat at a fourth average heating power, and if the flow rate of water flowing into the water tank is detected to be not larger than the preset flow rate, controlling the heating device to heat at a fifth average heating power;

when the temperature value of water in the water tank rises to a third preset temperature value, controlling the heating device to stop heating;

wherein the fourth average heating power is larger than the fifth average heating power, and the third preset temperature value is larger than or equal to the second preset temperature value.

In the above embodiments of the present invention, if the quantity of the water flowing into the water tank exceeds the preset flow rate, it indicates that the reduction of the water temperature in the water tank is reduced by large water consumption of the user, at this time, the heating device quickly heats the water tank at the fourth average heating power to shorten the heating time; if the quantity of the water flowing into the water tank does not exceed the preset flow rate, it indicates that the water consumption of the user is not large at the moment, then the heating device heats the water tank at the fifth average heating power, in this way, on the premise of guaranteeing a high heating rate and enough hot water available, the heating energy efficiency is improved, and the problem of high energy consumption caused by consistent high power heating is avoided; when the water temperature in the water tank rises to the third preset temperature value, it indicates that the water temperature in the water tank has met the use requirement at the moment, and thus the user can use hot water.

In a specific example of the present invention, whether water flows into the water tank is detected by detecting the reduction speed of the water temperature in the water tank, namely:

if the reduction speed of the water temperature in the water tank is larger than a preset water temperature reduction speed, controlling the heating device to heat at the fourth average heating power, and if the reduction speed of the water temperature in the water tank is not larger than the preset water temperature reduction speed, controlling the heating device to heat at the fifth average heating power.

Water flows into the water tank to reduce the water temperature in the water tank, if the reduction speed of the water temperature in the water tank is too high, for example, exceeding the preset water temperature reduction speed, it indicates that the user uses a large amount of water at the moment, thus a large amount of water flows into the water tank, at this time, the heating device quickly heats the water tank at the fourth average heating power to shorten the heating time and guarantee the water temperature in the water tank can quickly rise to a necessary temperature; if the reduction speed of the water temperature in the water tank does not exceed the preset water temperature reduction speed, it indicates that the water consumption of the user is not large at the moment, then the heating device can heat the water tank at the fifth average heating power, in this way, on the premise of guaranteeing the high heating rate and enough hot water available, the heating energy efficiency is improved.

In some embodiments of the present invention, when the temperature of water in the water tank is not larger than the first preset temperature value, controlling the heating device to heat at a sixth average heating power at first, and when the temperature value of water in the water tank rises to a fourth preset temperature value, heat at a seventh average heating power until the temperature value of water in the water tank rises to a fifth preset temperature value, and then controlling the heating device to stop heating;

wherein the sixth average heating power is larger than the seventh average heating power, and the fifth preset temperature value is larger than the fourth preset temperature value.

When the temperature of water in the water tank is too low, for example, lower than the first preset temperature value, not matter the too low water temperature is caused by what reason at the moment, the heating device quickly heats the water tank at the sixth average heating power until the water temperature rises to the fourth preset temperature value at first, and then slowly heats at the seventh average heating power until the water temperature can meet the use of the user, in this way, quick heating is carried out at first and then slow heating is carried out to give consideration to both the heating rate and the heating energy efficiency, and on the premise of shortening the heating time and guaranteeing hot water available in the water tank for use by the user, the heating energy efficiency is improved properly, and the energy consumption is reduced.

Further, the fifth preset temperature value is equal to the third preset temperature value;

the third average heating power, the fifth average heating power and the seventh average heating power are equal.

The fifth preset temperature value is equal to the third preset temperature value, to facilitate setting of a control program; the third average heating power, the fifth average heating power and the seventh average heating power are equal, also to facilitate setting of the control program, and meanwhile since the heating power is the same, the same heat source can be used for heating to reduce the number of heat sources, namely reducing the number of parts and components of the heat pump water heater and lowering the cost.

Of course, the fifth preset temperature value can also be not equal to the third preset temperature value, and the third average heating power, the fifth average heating power and the seventh average heating power can also be not equal, and they can be autonomously set in an actual application process according to demand.

In a specific embodiment of the present invention, the heating device includes a first sub-heating device, a second sub-heating device and a third sub-heating device, the first sub-heating device being a heat pump system, and both of the second sub-heating device and the third sub-heating device being electric heaters;

if the temperature value of water in the water tank is not larger than the first preset temperature value, controlling, by the controller, the second sub-heating device to heat at first, when the temperature value of water in the water tank rises to the fourth preset temperature value, controlling the first sub-heating device to heat, and when the temperature value of water in the water tank rises to the fifth preset temperature value, controlling the first sub-heating device to stop heating;

if the temperature value of water in the water tank is larger than the first preset temperature value and is not larger than the second preset temperature value, and the flow rate of water flowing into the water tank is larger than the preset flow rate, controlling the third sub-heating device to heat, and when the water temperature in the water tank rises to the fifth preset temperature value, controlling the third sub-heating device to stop heating; when detecting that the flow rate of water flowing into the water tank is not larger than the preset flow rate or no water flows into the water tank, controlling the first sub-heating device to heat, and when the water temperature in the water tank rises to the fifth preset temperature value, controlling the first sub-heating device to stop heating.

The electric heater has a higher heating rate, a lower heating efficiency and high energy consumption, while the heat pump system has a lower heating rate, a higher heating efficiency and low energy consumption, so that when the water temperature in the water tank is relatively low, the electric heater is used for quickly heating to shorten the heating time; when the water temperature is relatively high, the heat pump system is used for heating to improve the energy efficiency and reduce the energy consumption.

Embodiments in another aspect of the present invention provide a heat pump water heater, as shown in FIG. 2, including a water tank 2, a heating device and a controller (not shown in the figure).

In this case, a temperature sensor 8 (i.e., a temperature detecting device) and a first detecting device (not shown in the figure) for detecting whether water flows into the water tank are arranged on the water tank 2;

the heating device can heat water in the water tank 2 at different powers;

the heating device, the temperature sensor 8 and the first detecting device are all electrically connected with the controller, and the controller can control the heating device to heat at different powers.

In the heat pump water heater provided by the above embodiments of the present invention, the temperature detecting device capable of detecting water temperature is arranged on the water tank, when the temperature detecting device detects that the water temperature in the water tank is too low, for example, not larger than a first preset temperature value, the controller controls the heating device to quickly heat the water tank at a high power, in order to shorten the heating time and guarantee hot water available in the water tank for use by the user; when the temperature detecting device detects that the water temperature in the water tank is relatively high, for example, larger than a second preset temperature value, it indicates that no heating is necessary at the moment, and hot water in the water tank can be directly used; when the temperature detecting device detects that the water temperature in the water tank is between the first preset temperature value and the second preset temperature value, the water temperature in the water tank is relatively low, heating is necessary, and if the first detecting device detects that water flows into the water tank, it indicates that the reduction of the water temperature in the water tank is mainly caused by water consumption of the user, at this time, the controller controls the heating device to heat at a higher heating power, in order to quickly heat water flowing into the water tank for use by the user; if the water temperature in the water tank is between the first preset temperature value and the second preset temperature value, and no water flows into the water tank, it indicates that the reduction of the water temperature in the water tank is mainly caused by natural heat dissipation, at this time, the controller controls the heating device to heat at lower heating power to compensate for the reduction of the water temperature caused by the natural heat dissipation.

To sum up, in the heat pump water heater provided by the above embodiments of the present invention, when the temperature detecting device detects that the water temperature in the water tank is relatively low and heating is necessary, the first detecting device will further detect whether water flows into the water tank, to determine whether the reduction of the water temperature is caused by water consumption or natural heat dissipation at the moment, so as to heat at different heating powers according to different conditions, in this way, the heating time can be shortened to guarantee enough hot water for use by the user, and meanwhile the heating energy efficiency can be improved.

In a specific embodiment of the present invention, the first detecting device includes: a flowmeter arranged at a water inlet or a water outlet of the water tank 2, a comparing unit and a judging unit.

In this case, the comparing unit is electrically connected with the flowmeter, stores a preset flow rate therein, and is capable of comparing the preset flow rate with the flow rate of water detected by the flowmeter;

the judging unit is electrically connected with the comparing unit and capable of judging whether water flows into the water tank according to a comparative result of the comparing unit, and the judging unit is electrically connected with the controller. In the above-mentioned specific embodiment, the flowmeter is arranged at the water inlet or the water outlet of the water tank, the quantity of water flowing into the water tank can be obtained through detection by the flowmeter arranged at the water inlet, or the quantity of water flowing out of the water tank can be obtained through detection by the flowmeter arranged at the water outlet to obtain the quantity of water flowing into the water tank indirectly; then the comparing unit compares a detection result of the flowmeter with the preset flow rate stored therein and transmits the comparative result to the judging unit; if the comparative result is that the detection result is larger than the preset flow rate, the judging unit can determine that a large amount of water flows into the water tank at the moment, and otherwise, a small amount of water flows into the water tank; the controller controls the heating power of the heating device according to the judging structure of the judging unit.

In another specific embodiment of the present invention, the first detecting device includes: a comparing unit and a judging unit.

In this case, the comparing unit is electrically connected with the temperature detecting device, stores a preset water temperature reduction speed therein, and is capable of comparing the preset water temperature reduction speed with a water temperature reduction speed detected by the water temperature detecting device;

the judging unit is electrically connected with the comparing unit and capable of judging whether water flows into the water tank according to a comparative result of the comparing unit, and the judging unit is electrically connected with the controller. In the above specific embodiment, the temperature detecting device can detect the water temperature in the water tank in real time and transmit the detection result to the comparing unit; then the comparing unit compares the water temperature reduction speed detected by the water temperature detecting device with the preset water temperature reduction speed stored therein and transmits the comparative result to the judging unit; if the comparative result is that the detected water temperature reduction speed is larger than the preset water temperature reduction speed, the judging unit can determine that a large amount of water flows into the water tank at the moment to cause over fast water temperature reduction in the water tank, and otherwise, a small amount of water flows into the water tank; the controller controls the heating power of the heating device according to the judging structure of the judging unit.

Whether water flows into the water tank and the quantity of water flowing into the water tank are indirectly obtained by detecting the reduction speed of the water temperature in the water tank via the temperature detecting device, in this case, no flowmeter needs to be additionally provided to meter the flow rate of water, and thus the cost is saved.

In some embodiments of the present invention, the heating device includes a plurality of sub-heating devices, and the plurality of sub-heating devices are all electrically connected with the controller.

The heating powers of the plurality of sub-heating devices can be the same and can also be different, the controller can control a certain sub-heating device to heat and can also simultaneously control the plurality of sub-heating devices to heat, such that the heating device can heat the water in the water tank at different powers, and thus the heating power of the heating device is controlled according to the water consumption condition of the user or the natural heat dissipation of the water tank and the like to improve the heating energy efficiency while guaranteeing the heating rate.

In a specific embodiment of the present invention, the heating device includes a first sub-heating device, a second sub-heating device and a third sub-heating device, and the first sub-heating device, the second sub-heating device and the third sub-heating device are all electrically connected with the controller.

Further, as shown in FIG. 2, the first sub-heating device includes a heat pump system composed of a compressor 1, a condenser 3, a throttling component 4 and an evaporator 5, which are connected in sequence, a condenser pipe of the condenser 3 being coiled on the water tank 2, and the compressor 1 being electrically connected with the controller;

both of the second sub-heating device and the third sub-heating device are electric heaters, the second sub-heating device being an upper electric heater 6 which is installed at one end close to the water inlet (formed in the lower end of the water tank 2) of the water tank 2, and the third sub-heating device being a lower electric heater 7 which is installed at one end close to the water outlet (formed in the upper end of the water tank 2) of the water tank 2.

Preferably, the heating powers of the upper electric heater 6 and the lower electric heater 7 are the same.

The heat pump water heater and the control method thereof provided by the present invention will be illustrated below in detail in combination with FIGS. 1 and 2.

As shown in FIG. 2, the temperature sensor 8 (i.e., the temperature detecting device), the upper electric heater 6

(i.e., the second sub-heating device, which is located at the end close to the water inlet of the water tank 2), and the lower electric heater 7 (i.e., the third sub-heating device, which is located at the end close to the water outlet of the water tank 2) are arranged on the water tank 2 of the heat pump water heater, and the heat pump system (i.e., the first sub-heating device) of the heat pump water heater includes the compressor 1, the condenser 3, the throttling component 4 and the evaporator 5, the condenser pipe of the condenser 3 being coiled on the water tank 2 for heating the water tank 2.

Figure 1:
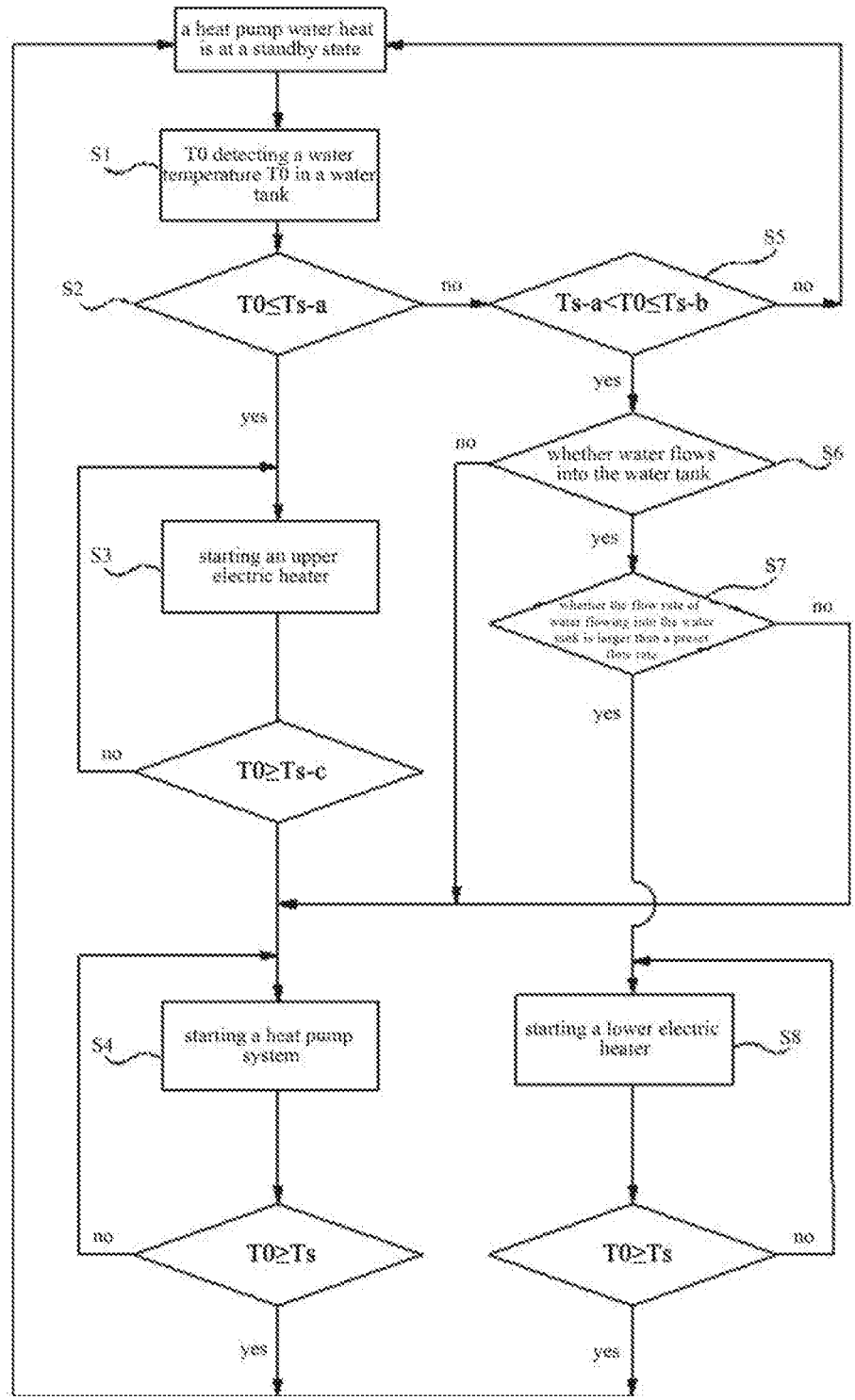
FIG. 1 is a schematic flow diagram of a control method of a heat pump water heater according to an embodiment of the present invention.

As shown in FIG. 1, after being started, the heat pump water heater is at a standby state at first and then enters step S1;

step S1, detecting, by the temperature sensor 8, the temperature T0 of water in the water tank 2;

step S2, comparing the water temperature T0 with Ts-a (i.e., the first preset temperature value), if T0≤Ts-a, entering step S3, and if T0>Ts-a, entering step S5;

step S3, starting the upper electric heater 6 for heating until T0≥Ts-c (i.e., the fourth preset temperature value), and then entering step S4;

step S4, starting the heat pump system for heating until T0≥Ts (i.e., the fifth preset temperature value), and then entering the standby state of the water heater again;

step S5, comparing T0 with Ts-a and Ts-b (i.e., the second preset temperature value), if Ts-a<T0≤Ts-b, entering step S6, and if T0>Ts-b, entering the standby state of the heat pump water heater again;

step S6, judging whether water flows into the water tank 2, if so, entering step S7, and otherwise, entering step S4;

step S7, judging whether a large amount of water flows into the water tank 2, if so, entering step S8, and otherwise, entering step S4;

step S8, starting the lower electric heater 7 for heating until T0≥Ts (i.e., the third preset temperature value, which is equal to the fifth preset temperature value), and then entering the standby state of the water heater again.

It should be noted that, when Ts-a<T0≤Ts-b is caused by large water consumption, the lower electric heater 7 close to the water outlet is started for heating, so that hot water can quickly flow out via the water outlet.

In a specific example, it is set that Ts=60° C., a=15° C., b=2° C.

1. Detecting the current water temperature T0=57° C.;
2. judging whether the current water temperature T0 is smaller than or equal to 60° C.-15° C., and the current water temperature T0=57° C. is not within the range;
3. judging whether the current water temperature is between 60° C.-15° C. and 60° C.-2° C., and the current water temperature T0=57° C. is within the range;
4. judging whether water flows into the water tank and the quantity of the water flowing into the water tank by judging the reduction speed of the water temperature in the water tank or adopting other solutions, for example, setting that when the reduction speed of the water temperature in the water tank is larger than 0.5° C./min, it is considered that a large amount of water (namely, water exceeding the preset flow rate) flows into the water tank, when detecting that the reduction speed of the current water temperature is 0.3° C./min, it is considered that only a small amount of water flows into the water tank (when the reduction speed of the water temperature is quite small, for example, lower than 0.1° C./h, it is considered that no water flows into the water tank, and the water tank is at a natural heat dissipation state);
5. at this time, starting the heat pump system for heating, and stopping when T0=60° C.;
6. entering the standby state of the heat pump water heater again.

To sum up, in the control method for the heat pump water heater provided by the embodiments of the present invention. it determines which heat source to start at what time to heat the water in the water tank, by considering such actual conditions as the difference between the water temperature in the water tank and the preset temperature values, whether the water tank is at the natural heat dissipation state, whether cold water flows into the water tank and the quantity of the cold water flowing into the water tank, and the like, so that the relation between the heating time and the heating efficiency is well balanced, and thus the purpose of short heating time and high heating efficiency is achieved.

In the descriptions of the present invention, the term "a plurality of" refers to two or more; the term "fixed" and the like should be broadly understood, for example, the meaning of "fixed" can be non-detachably fixed and can also be detachably fixed; can be directly fixed and can also be indirect fixedly via a medium. Those of ordinary skill in the art can understand the specific meanings of the above terms in the present invention according to specific conditions.

In the descriptions of the present invention, the terms "first" and "second" are only for the purpose of description and should not be understood as indicating or implying relative importance.

In the descriptions of the specification, the descriptions by the terms one embodiment", some embodiments", "a specific embodiment" and the like mean that specific features, structures, materials or characteristics described in combination with the embodiments or examples are contained in at least one embodiment or example of the present invention. In the description, schematic representation of the above terms is not necessarily referring to the same embodiment or example.

Furthermore, the described specific features, structures, materials or characteristics can be combined in one or more embodiments or examples in a proper manner.

The foregoing descriptions are merely preferred embodiments of the present invention, rather than limiting the present invention. Those skilled in the art can make various modifications and variations to the present invention. Any modifications, equivalent substitutions, improvements and the like made within the spirit and principle of the present invention should be encompassed within the protection scope of the present invention.

The invention claimed is:

1. A heat pump water heater, comprising:
   a water tank, wherein a temperature detector and a first detector for detecting whether water flows into the water tank are arranged on the water tank;
   a heater for heating water in the water tank; and
   a controller, wherein the heater, the temperature detector and the first detector are all electrically connected with the controller, and the controller is configured to control the heater to heat at different powers,
   wherein the first detector comprises:
   a flowmeter arranged at a water inlet or a water outlet of the water tank; and
   a comparator, wherein the comparator is electrically connected with the flowmeter, and is configured to store a preset flow rate therein, and to compare the preset flow rate with a flow rate of water detected by the flowmeter;
   wherein the controller is configured to:
   control the heater to heat at a first average heating power if a temperature of water in the water tank is not higher than a first preset temperature;

control the heater to stop heating if the temperature of water in the water tank is higher than a second preset temperature;

control the heater to heat at a second average heating power if the temperature of water in the water tank is between the first preset temperature and the second preset temperature, and the flow rate of water detected by the flowmeter is higher than the preset flow rate;

control the heater to heat at a third average heating power if the temperature of water in the water tank is between the first preset temperature and the second preset temperature, and the flow rate of water detected by the flowmeter is not higher than the preset flow rate; and, wherein the second preset temperature is higher than the first preset temperature, and the first average heating power and the second average heating power are larger than the third average heating power;

wherein the heater comprises a first sub-heater, a second sub-heater and a third sub-heater, and the first sub-heater, the second sub-heater and the third sub-heater are all electrically connected with the controller; the first sub-heater comprises a heat pump, both of the second sub-heater and the third sub-heater are electric heaters;

wherein the controller is further configured to:

if the temperature of water in the water tank is not higher than the first preset temperature, control the second sub-heater to heat at first, when the temperature of water in the water tank rises to the fourth preset temperature, control the first sub-heater to heat, and when the temperature of water in the water tank rises to the fifth preset temperature, controlling the first sub-heater to stop heating; and if the temperature of water in the water tank is between the first preset temperature and the second preset temperature, and the flow rate of water flowing into the water tank is higher than the preset flow rate, control the third sub-heater to heat, and when the water temperature in the water tank rises to the fifth preset temperature, control the third sub-heater to stop heating; when detecting that the flow rate of water flowing into the water tank is not higher than the preset flow rate, control the first sub-heater to heat, and when the water temperature in the water tank rises to the fifth preset temperature, control the first sub-heater to stop heating;

wherein the fifth preset temperature is higher than the fourth preset temperature.

2. The heat pump water heater of claim 1, wherein, the heater comprises a plurality of sub-heaters, and the plurality of sub-heaters are all electrically connected with the controller.

3. The heat pump water heater of claim 1, wherein, the heat pump composed of a compressor, a condenser, a throttling component and an evaporator, which are connected in sequence, a condenser pipe of the condenser being coiled on the water tank, and the compressor being electrically connected with the controller;

the second sub-heater being installed at one end close to a water inlet of the water tank, and the third sub-heater being installed at one end close to a water outlet of the water tank.

4. The heat pump water heater of claim 1, wherein, the heat pump composed of a compressor, a condenser, a throttling component and an evaporator, which are connected in sequence, a condenser pipe of the condenser being coiled on the water tank, and the compressor being electrically connected with the controller;

the second sub-heater being installed at one end close to a water outlet of the water tank, and the third sub-heater being installed at one end close to a water inlet of the water tank.

5. A heat pump water heater, comprising:

a water tank, wherein a temperature detector and a first detector for detecting whether water flows into the water tank are arranged on the water tank;

a heater for heating water in the water tank; and a controller, wherein the heater, the temperature detector and the first detector are all electrically connected with the controller, and the controller is configured to control the heater to heat at different powers, wherein the first detector comprises:

a flowmeter arranged at a water inlet or a water outlet of the water tank; and a comparator, wherein the comparator is electrically connected with the temperature detector, and is configured to store a preset water temperature reduction speed therein, and to compare the preset water temperature reduction speed with a water temperature reduction speed detected by the water temperature detector;

wherein the controller is configured to:

control the heater to heat at a first average heating power if a temperature of water in the water tank is not higher than a first preset temperature;

control the heater to stop heating if the temperature of water in the water tank is higher than a second preset temperature;

control the heater to heat at a second average heating power if the temperature of water in the water tank is between the first preset temperature and the second preset temperature, and the water temperature reduction speed detected by the water temperature detector is higher than the preset water temperature reduction speed;

control the heater to heat at a third average heating power if the temperature of water in the water tank is between the first preset temperature and the second preset temperature, and the water temperature reduction speed detected by the water temperature detector is not higher than the preset water temperature reduction speed;

the second preset temperature is higher than the first preset temperature, the first average heating power and the second average heating power are larger than the third average heating power;

wherein the heater comprises a first sub-heater, a second sub-heater and a third sub-heater, and the first sub-heater, the second sub-heater and the third sub-heater are all electrically connected with the controller; the first sub-heater comprises a heat pump, both of the second sub-heater and the third sub-heater are electric heaters;

wherein the controller is further configured to:

if the temperature of water in the water tank is not higher than the first preset temperature, control the second sub-heater to heat at first, when the temperature of water in the water tank rises to the fourth preset temperature, control the first sub-heater to heat, and when the temperature of water in the water tank rises to the fifth preset temperature, controlling the first sub-heater to stop heating; and if the temperature of water in the water tank is between the first preset temperature and the second preset temperature, and the flow rate of water flowing into the water tank is higher than the preset flow rate, control the third sub-heater to heat, and when the water temperature in the water tank rises to the fifth preset temperature, control the third sub-heater to stop heating; when detecting that the flow rate of water flowing into the water tank is not higher than the preset flow rate, control the first sub-heater to heat, and when the water temperature in the water tank rises to the fifth preset temperature, control the first sub-heater to stop heating;

wherein the fifth preset temperature is higher than the fourth preset temperature.

* * * * *